Aug. 12, 1941.                M. SKOLNIK                2,252,213
                          DIALYZING APPARATUS
                        Filed Aug. 30, 1939            2 Sheets-Sheet 1
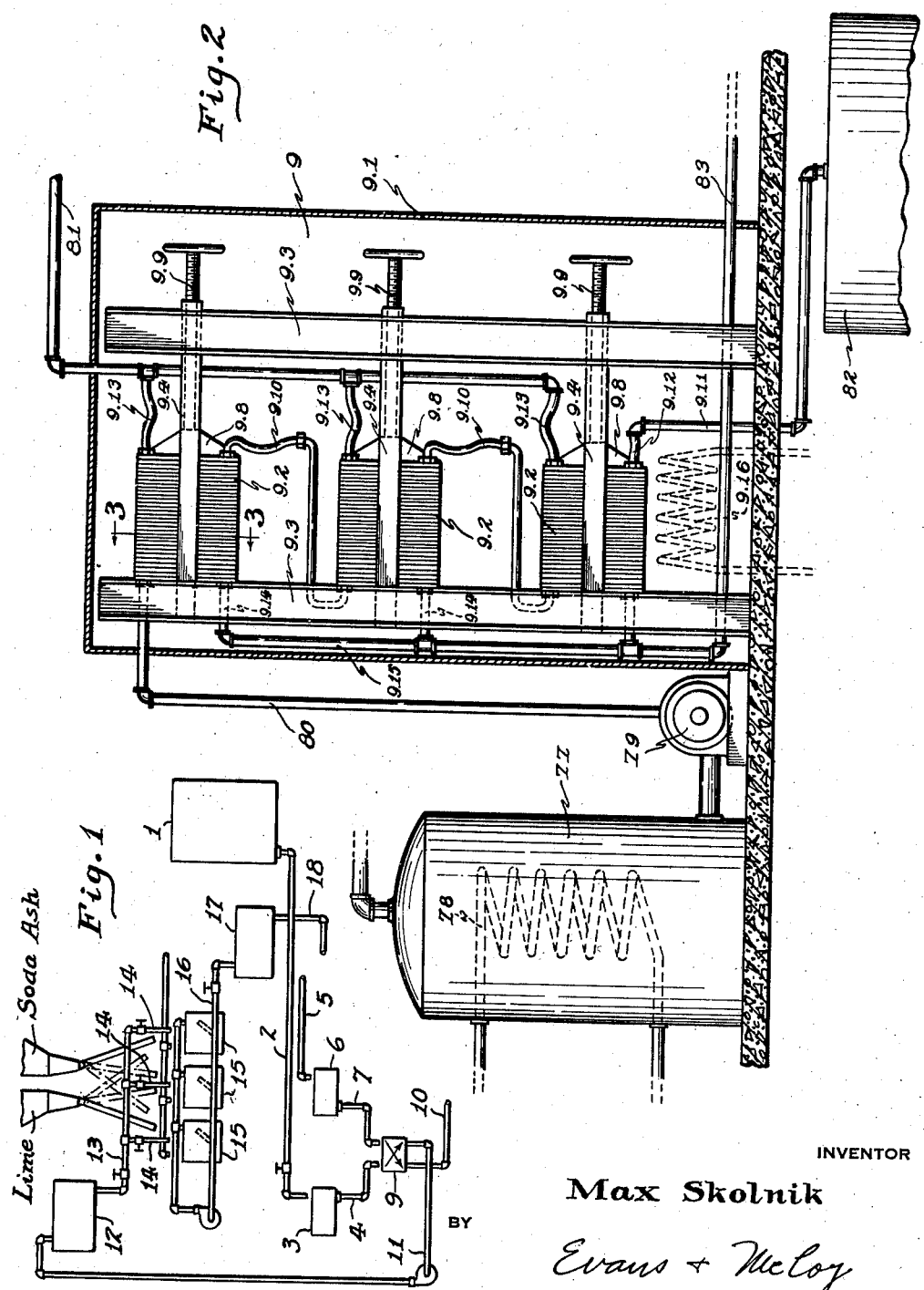
INVENTOR
Max Skolnik
BY
Evans + McCoy
ATTORNEYS

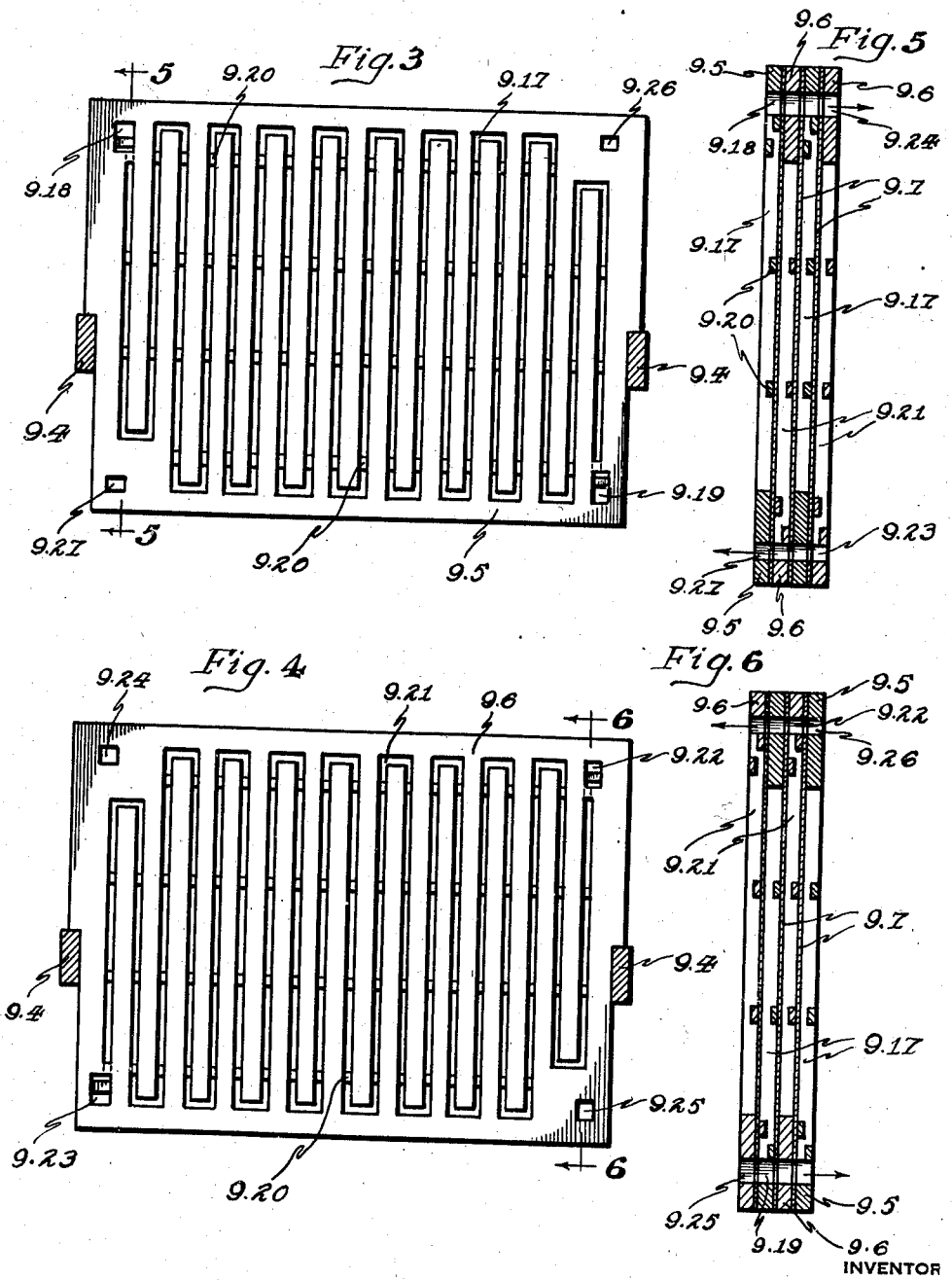

Patented Aug. 12, 1941

2,252,213

UNITED STATES PATENT OFFICE 2,252,213

DIALYZING APPARATUS

Max Skolnik, Chicago, Ill.

Application August 30, 1939, Serial No. 292,688

4 Claims. (Cl. 210—8.5)

This invention relates to a method and apparatus for separating chemicals from the by-product liquor obtained in the manufacture of paper pulp. More particularly, this invention relates to apparatus for separating alkali from alkaline solutions of lignin which are obtained in the preparation of pulp from straw, and to the method for treating the separated material for its reuse in the preparation of paper.

This application is a continuation in part of my co-pending applications Serial No. 6,019, filed February 11, 1935, and Serial No. 201,525, filed April 12, 1938.

In the preparation of paper pulp from straw, the straw is cooked with a solution of alkali such as sodium hydroxide, to remove the lignin and binding material from the fibres. In the process, most of the lignin remains in the cooking solution and some of the alkali combines with carbon dioxide to form sodium carbonate. In order to prevent the loss of large quantities of alkali and in order to permit the preparation of lignin in a commercial form, it is desirable to remove the alkali and alkali metal carbonate from the cooking liquor and to recausticize to obtain the alkali hydroxide for reuse in cooking.

It is, therefore, an object of this invention to provide apparatus for separating the soluble inorganic ingredients from the liquor obtained by cooking straw in a solution of alkali.

It is a further object of this invention to provide dialyzing apparatus of increased efficiency.

Another object of this invention is to provide a method for separating the soluble inorganic ingredients from the liquor, obtained by cooking straw in alkali, and to recausticize the separated inorganic ingredients to form an alkali solution suitable for reuse in paper pulp making.

Other objects will be apparent from the following detailed description of the method and apparatus as illustrated by the accompanying drawings, in which:

Figure 1 is a diagrammatic sketch of apparatus suitable for the recovery of soluble inorganic material from the lignin-containing liquor and the recausticizing of the recovered material to prepare it for reuse in the preparation of paper;

Fig. 2 is a view showing in elevation a dialyzer or alkali and lignin-separating apparatus;

Fig. 3 is a front view of one of the plates of the dialyzer as it would appear in a sectional view taken on the line 3—3 of Fig. 2;

Fig. 4 is a similar view of an alternate plate of the dialyzer;

Fig. 5 is a sectional view taken transversely through a plurality of assembled plates, as would appear in a section taken on line 5—5 of Fig. 3; and Fig. 6 is a similar view as would appear in section taken on the line 6—6 of Fig. 4.

In the recovery of the alkali used in the production of pulp from straw, the liquor which preferably has been concentrated by evaporation and which contains the alkali such as sodium hydroxide together with alkali metal carbonate and the dissolved lignin obtained from the straw, is fed from a suitable tank 1, through the pipe 2 to the header tank 3 where the level is automatically maintained substantially constant by well known apparatus (not shown). The liquor from the tank 3 flows under substantially constant head through the pipe 4 into the dialyzer 9 where the soluble organic material diffuses substantially completely through a permeable membrane into water which is supplied from a suitable source through the pipe 5, the pressure regulating tank 6 and the pipe 7 to the dialyzer 9. The water and the liquor flow at substantially constant rates through the dialyzer, the water being at all times separated from the lignin-containing liquor by suitable permeable membranes, such as parchment paper or other vegetable membranes. The lignin-containing liquor, having substantially all the soluble inorganic material removed therefrom, is removed from the dialyzer through the pipe 10 and is further processed to obtain the lignin in commercial form. The aqueous solution of inorganic material, having the alkali and alkali metal carbonate removed from the lignin liquor, is pumped from the dialyzer 9 through the pipe 11 into the storage tank 12. The solution from the tank 12 is fed through the pipe 13 and the nozzles 14 over lime or lime and soda ash mixtures in causticizing tanks 15.

In the tanks 15 the alkali metal carbonate is converted to alkali by chemical reaction with the lime and the alkali content of the solution is further increased by contact with the soda ash. The recausticized solution of alkali flows from the reaction tanks 15 through suitable strainers and the pipe 16 into the settling tank 17 where any suspended calcium carbonate is allowed to settle out. The clear liquid is returned through the pipe 18 to suitable cooking apparatus for reacting with straw.

The diffusion of alkali through a permeable membrane is more rapid at elevated temperatures and it, accordingly, is desirable that the lignin-containing liquor be passed through a heating tank 77 of the specific embodiment of the dialyzer illustrated in Fig. 2, in which is mounted a heating coil 78 for the purpose of heating the liquor to a suitable temperature for the dialyzing process, the lignin-containing liquor being extracted from the tank 77 by the pump 79 and delivered by conduit 80 to the dialyzing apparatus 9.

It is preferable in most cases to evaporate the lignin-containing liquor during the heating proper in order to increase the concentration of lignins and alkali in the liquor as it is delivered to the dialyzing device 9, thus obtaining a lignin by-product containing a lesser amount of water. It will be understood that the tank 77 will also be adapted to serve as an evaporator as well as a heater. The dialyzing process is a well known method of separating bodies, and is based on their unequal diffusibility characteristics, that is, with a mixture of bodies having unequal diffusibility characteristics placed on one side of a porous membrane such as a sheet of parchment paper, and placing water on the other said membrane, the body having the greatest diffusibility characteristics will pass through the membrane and into the water. In the dialyzing apparatus 9 the lignin solution is passed over one side of the porous membrane and substantially clear water is passed over the other side of the said membrane, the alkali having the greatest diffusibility characteristic passing through the membrane and into the water.

A substantially fresh water supply is provided from a suitable source through conduit 81. The dialyzer 9 is shown in detail in Figs. 2 to 6 inclusive. As shown in Fig. 2, the dialyzer comprises a housing 9.1 in which a plurality of dialyzer sections 9.2 are supported on a steel framework comprising vertical steel members 9.3 and a plurality of horizontal cross members 9.4.

There are two supporting frames such as shown in Fig. 2, wherein only the nearest frame appears, which are positioned side by side and one or more dialyzer sections 9.2 are supported between these frames on the cross-bars 9.4. Each dialyzer section is made up of a plurality of plates 9.5 and 9.6, such as shown in Figs. 3 and 4, arranged face to face alternately.

A diaphragm of porous membrane 9.7 such as parchment or the like is disposed between each of the plates comprising the dialyzer section and these plates, together with the membrane 9.7 are clamped together face to face as shown in Figs. 5 and 6 by a header plate 9.8 which is put under pressure by a screw jack 9.9. The liquids passing through the dialyzer plates travel in opposite directions relative to each other through passages in the plates as will be hereafter described. As shown in Fig. 2, the liquor to be dialyzed taken from the tank 77 by the pump 79 enters the dialyzer at the upper corner of one end and leaves at the diagonally opposite lower corner of the opposite end. It is preferable that the dark liquor from the tank 77 pass through the dialyzer sections serially and thus flexible connections 9.10 are connected between the dark liquor exit port of one section and the dark liquor entrance port of the next succeeding section, and after leaving the last or final dialyzer section the dark liquor passes through a conduit 9.11 to a lignin storage tank (not shown), the lignin liquor leaving the dialyzer having had substantially all of its alkali content removed in the dialyzer.

As shown in Fig. 2, the conduit 9.11 is connected to the last dialyzer section by a flexible connection 9.12 in order to permit movement of the header plate 9.8 for the disassembly of the plates comprising the dialyzer sections.

The substantially fresh water, herein termed the white liquor or dialyzing solution, is supplied to the dialyzer sections through the pipe 81 which has connections with the dialyzer sections on the same side thereof as the dark liquor exit ports, but at the corner vertically opposite the said dark liquor exit ports. Thus the white liquor passes through the dialyzer in a direction opposite to that taken by the dark liquor and leaves the dialyzer at the corner vertically opposite the dark liquor entrance port.

As shown in Fig. 2 the white liquor passes through one section only of the several dialyzers, and the supply pipe 81 is connected with the several dialyzer sections by means of flexible branch connections 9.13, the white liquor exit connections 9.14 being connected to a header 9.15 which leads to a conduit 83.

In order to keep the liquors from cooling as they pass through the dialyzer and to maintain the temperature thereof at the point most suitable for maximum dialyzing action, a heating coil 9.16 is provided in some suitable portion of the housing 9.1 such as at the bottom thereof as shown in Fig. 2.

Referring to Figs. 3 to 6 inclusive, it will be seen that the alternating dialyzer plates are each provided with a tortuous passageway which travels back and forth across the face of the plate from one corner thereof to a diagonally opposite corner thereof. The passageways of the two plates 9.5 and 9.6 are arranged so as to be substantially in registration when the plates are set face to face. However, the passageway of one plate begins and ends at horizontally opposite corners from which the passageway of the alternate plate begins and ends.

Referring in detail to Fig. 3 the passageway 9.17 of the plate 9.5, which shall be considered as a dark liquor plate, begins at the upper left-hand corner of the plate as shown in Fig. 3 and travels back and forth across the face of the plate, terminating at the lower right-hand corner thereof.

The beginning end of the passageway 9.17 communicates with an aperture 9.18, which extends through the plate from face to face, and the end of the passageway 9.17 is at a similar aperture 9.19 which extends through the plate at the diagonally opposite corner from the aperture 9.18. The passageway 9.17 extends entirely through the plate from face to face, but for purposes of strength bridges of metal 9.20 are formed to span the passageway 9.17 in a manner shown in Fig. 3, the bridges being provided by leaving a portion of the material having about one-half the thickness of the plate at the time the plate is formed, the lesser thickness of the bridge 9.20 permitting the liquor to pass by the same as it travels along the passageway 9.17.

As heretofore stated, the passageways 9.17 and 9.21 in the plates 9.5 and 9.6 respectively are arranged so as to be in registry when the plates are mounted face to face on the supporting bars 9.4, and as will be noted from Figs. 5 and 6 the apertures 9.18 and 9.19 of the plate 9.5 will be in registry with apertures 9.24 and 9.25 of the plate 9.6, the latter two apertures having no connection with the passageway 9.21. Likewise, the apertures 9.22 and 9.23 of plate 6 will be in registry with apertures 9.26 and 9.27 of plate 9.5 which likewise have no connection with the passageway 9.17. Thus by referring to Figures 5 and 6, it will be seen that the registering apertures 9.18 and 9.24, of the alternate plates, form a continuous intake passageway through the assembled plates comprising the dialyzer section and likewise the registering apertures 9.19 and 9.25 form a continuous discharge passageway through the section, so that entering dark liquor flowing through the passageway formed by the registered apertures 9.18 and 9.24 will flow through the channels 9.17 of the respective dark liquor plates 9.5 only, the membrane 9.7 serving as a gasket between the adjacent plates 9.5 and 9.6.

Likewise, with reference to Fig. 6, entering fresh water flowing through the passageway formed by the registering apertures 9.22 and 9.26 will flow only through the channels 9.21 of the respective white liquor plates 9.6 to the exit passageway through the section formed by the registering apertures 9.23 and 9.27.

The direction of flow of the liquids relative to the assembled plates is indicated by the arrows in Figs. 5 and 6.

As has been heretofore stated, the action of the dialyzer is that of diffusing a body, carried in one liquor, through a porous membrane into another liquor, and since the passageways 9.17 and 9.21 are in registry a relatively large area of porous membrane is exposed to the two liquids. The water or white liquid may be passed through one dialyzer section only, in order that a maximum absorption in each section may be had, and the lignin-containing liquor may be passed through the several dialyzer sections serially in order to increase the length of its time in contact with the membrane to assure a maximum extraction of the soda from the dark liquor solution. It will be seen that the plates may be connected to cause the liquids to flow in series in opposite directions.

The above described dialyzing apparatus provides relatively efficient separation of soluble inorganic materials from the lignin-containing liquor. By using a tortuous passage over the surface of the membrane, one obtains a relatively high velocity of liquid through the passageways, and the skin effect, or the thickness of the layer of adherent stationary liquid on the membranes is reduced, with the result that an increased rate of diffusion and increased efficiency is obtained.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A dialyzer consisting of a series of flat plates separated by permeable membranes, each plate comprising a rectangular frame having apertures adjacent each of its four corners, a plurality of integral, spaced parallel tongues projecting from one side of said frame toward the opposite side of said frame, a plurality of similar parallel tongues projecting from the opposite side of said frame and integral therewith, the tongues integral with one side interleaving with the tongues integral with the other side so that the adjacent tongues are integral with opposite sides of said frame, said tongues being of substantially the thickness of said frame and being spaced from each other and from the unattached sides of said frame to provide a single tortuous passageway of relatively small cross sectional area between apertures in diagonally opposite corners of said frame.

2. A dialyzer plate comprising a rectangular frame having apertures adjacent each of its four corners, a plurality of integral, spaced parallel tongues projecting from one side of said frame toward the opposite side of said frame, a plurality of similar parallel tongues projecting from the opposite side of said frame and integral therewith, the tongues integral with one side interleaving with the tongues integral with the other side so that the adjacent tongues are integral with opposite sides of said frame, said tongues being of substantially the thickness of said frame and being spaced from each other and from the unattached sides of said frame to provide a single tortuous passageway of relatively small cross sectional area between apertures in diagonally opposite corners of said frame.

3. A dialyzer plate comprising a rectangular frame having apertures adjacent each of its four corners, a plurality of integral, spaced parallel tongues projecting from one side of said frame toward the opposite side of said frame, a plurality of similar parallel tongues projecting from the opposite side of said frame and integral therewith, the tongues integral with one side interleaving with the tongues integral with the other side so that the adjacent tongues are integral with opposite sides of said frame, said tongues being of substantially the thickness of said frame and being spaced from each other and from the unattached sides of said frame to provide a single tortuous passageway of relatively small cross sectional area between apertures in diagonally opposite corners of said frame, and reinforcing bridges, having a thickness not substantially greater than one-half the thickness of said plate, extending across said passageway and connecting adjacent tongues.

4. A dialyzer plate comprising a rectangular frame having apertures adjacent each of its four corners, a plurality of integral, flat parallel tongues, having greater width than thickness and having a substantially rectangular cross section, projecting from one side of said frame toward the opposite side of said frame, a plurality of similar parallel tongues projecting from the opposite side of said frame and integral therewith, the tongues integral with one side interleaving with the tongues integral with the other side so that the adjacent tongues are integral with opposite sides of said frame, said tongues being of substantially the thickness of said frame and being spaced from each other and from the unattached sides of said frame to provide a single tortuous passageway of relatively small cross sectional area between apertures in diagonally opposite corners of said frame, and reinforcing bridges, having a thickness not substantially greater than one-half the thickness of said plate, extending across said passageway and connecting adjacent tongues.

MAX SKOLNIK.